May 18, 1926.
H. A. REELEY
DRAFT MECHANISM
Filed July 2, 1925    2 Sheets-Sheet 1
1,585,603
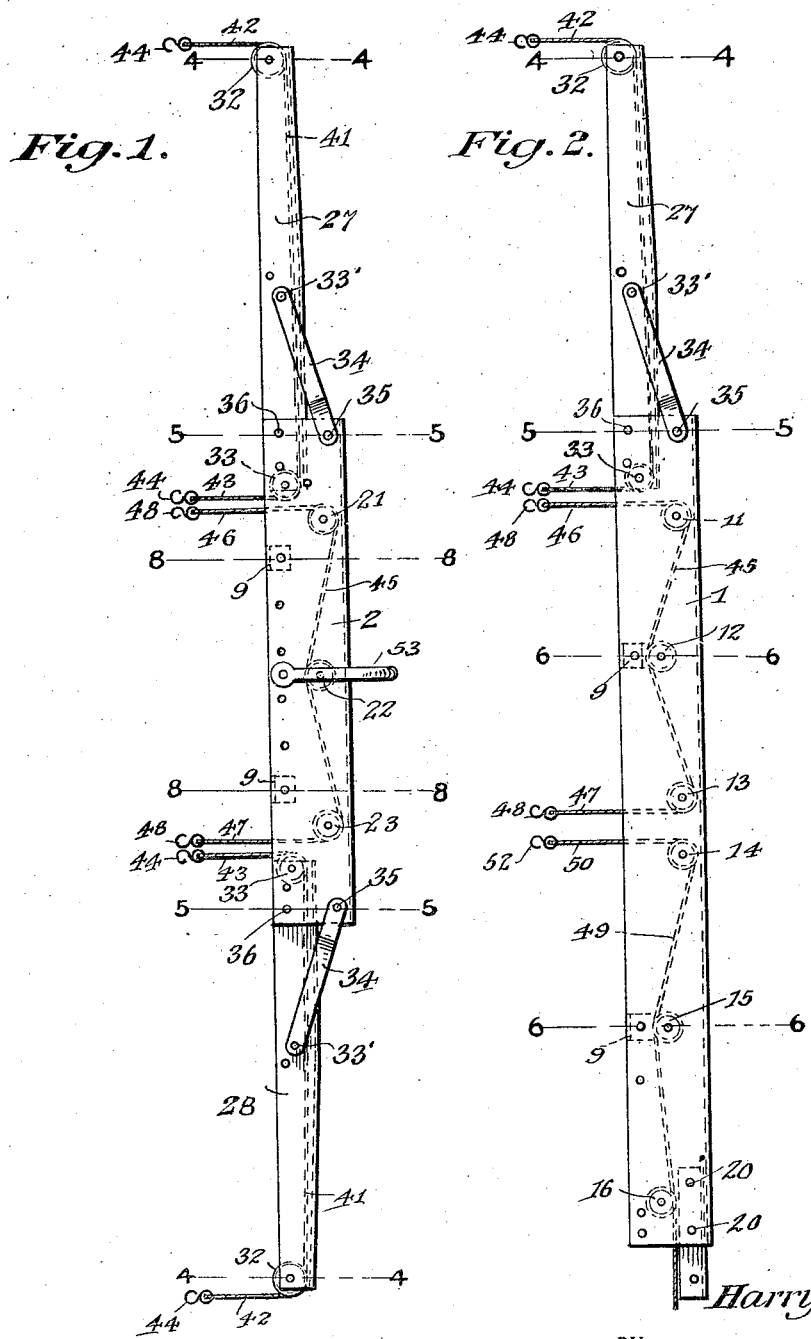
INVENTOR.
Harry A. Reeley,
BY
Geo. P. Kimmel ATTORNEY.

May 18, 1926.
H. A. REELEY
DRAFT MECHANISM
Filed July 2, 1925    2 Sheets-Sheet 2
1,585,603
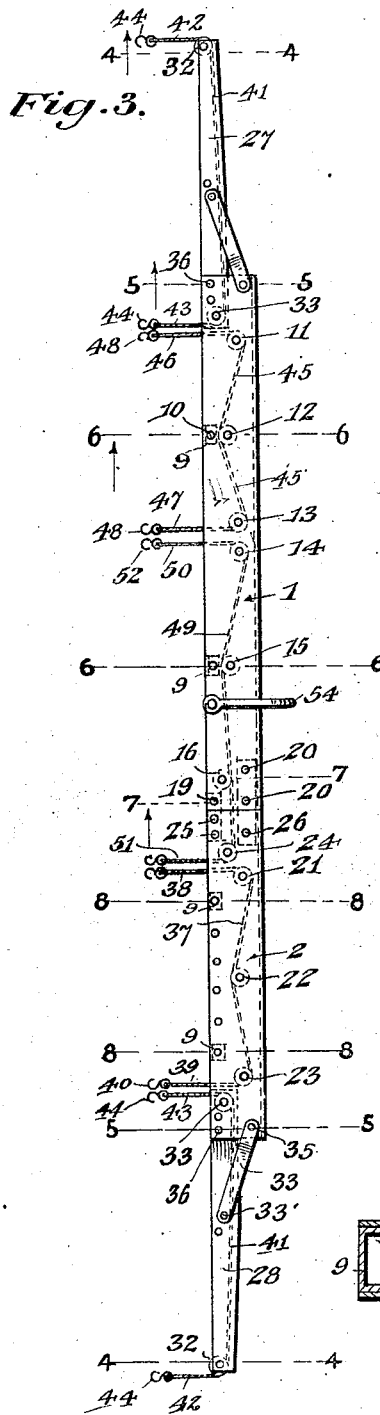
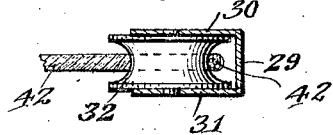
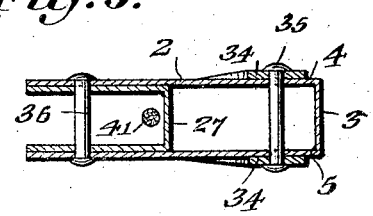
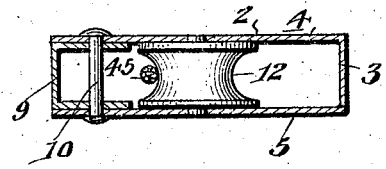
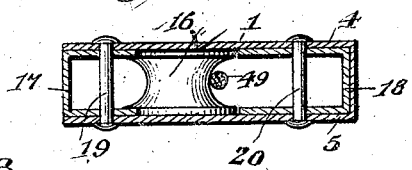
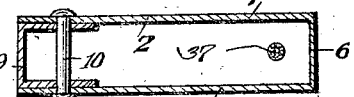
INVENTOR.
Harry A. Reeley,
BY
Geo. P. Kimmel ATTORNEY.

Patented May 18, 1926.

1,585,603

UNITED STATES PATENT OFFICE.

HARRY A. REELEY, OF MARION, OHIO.

DRAFT MECHANISM.

Application filed July 2, 1925. Serial No. 41,144.

This invention relates to a draft mechanism, such as used for drawing agricultural implements or vehicles, and has for its object to provide, in a manner as hereinafter set forth, an extensible draft mechanism constructed to enable the hitching thereto of one or more draft animals when desired, or in other words, to provide a draft mechanism capable of being employed with a hitch of from one to five animals.

Further objects of the invention are to provide, in a manner as hereinafter set forth, a draft mechanism which is simple in its construction and arrangement, strong, durable, thoroughly efficient in its use, readily adjusted for hitching thereto the desired number of draft animals, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view showing the adaptation of a draft mechanism, in accordance with this invention, for a three hitch.

Figure 2 is a fragmentary view, in top plan, illustrating one of the sections of the body portion.

Figure 3 is a top plan view illustrating the adaptation of a draft mechanism, in accordance with this invention for a five hitch.

Figure 4 is a section on lines 4—4, Figures 1, 2 and 3.

Figure 5 is a section on lines 5—5, Figures 1, 2 and 3.

Figure 6 is a section on lines 6—6, Figures 2 and 3.

Figure 7 is a section on line 7—7, Figure 3.

Figure 8 is a section on lines 8—8, Figures 1 and 3.

A draft mechanism, in accordance with this invention, comprises a body portion formed of two sections, 1 and 2. The former is of greater length than the latter. The sections 1 and 2 are detachably connected together. When the draft mechanism is employed for a three hitch, the section 2 of the body portion is only used, but when employed for a five hitch the sections 1 and 2 are connected together and the latter extends from the inner end of the former. The sections 1 and 2 are yoke-shaped in cross section, and the former consists of a vertically disposed rear wall 3, a top wall 4 and a bottom wall 5. The section 2 comprises a vertically disposed rear wall 6, a top wall 7 and a bottom wall 8. When the sections 1 and 2 are connected together, see Figure 3, the inner end of the section 2 abuts against the inner end of section 1. The sections 1 and 2 are of the same size, with this exception, that the section 2 is of less length than the section 1. The front of each of the body sections is open.

Secured between the transverse center and each end of the section 1 is a yoke-shaped brace member 9, which is clearly shown in Figure 6 and extends in an opposite direction with respect to the section 1, and so that the closed end of each of the members 9 will be flush with the forward edges of the walls 4 and 5 of the body section 1. The brace members 9 are fixedly secured to the section 1 by rivets 10. Figure 6 clearly shows a rivet 10.

Arranged within the section 1 is a series of spaced sheaves 11, 12, 13, 14, 15 and 16. The sheaves 11 and 13 are arranged in alignment, and the sheave 12 is interposed between the sheaves 11 and 13 but forwardly with respect thereto and arranged in proximity to one of the brace members 9. The sheaves 14 and 16 have arranged therebetween the sheave 15, but the latter is arranged forwardly with respect to the sheave 14 and rearwardly with respect to the sheave 16. The sheave 15 is positioned in proximity to the other brace member 9.

Arranged within and projecting from the inner end of the section 1 is a pair of connecting members 17 and 18 and each of which is yoke-shaped in cross section. The member 17 is of less length and less width than the member 18, and said members 17 and 18 are oppositely disposed with respect to each other. The closed end of the member 17 is flush with the forward edges of the walls 4 and 5 of the section 1, and the closed end of the section 18 abuts against the inner face of the rear wall 3 of the section 1. The member 17 is secured to the section 1 by a hold-fast device 19. See Figure 7. The member 18 is secured to the section 1 by a pair of hold-fast devices 20, one of which is shown in Figure 7. The inner end of the member 18 is spaced from the sheave 16, and the latter is also spaced from the member 18, see dotted line position in Figure 3.

Arranged within the section 2, and spaced forwardly from the rear wall 6 thereof, is a series of spaced sheaves 21, 22 and 23. The sheave 22 is arranged between the sheaves 21 and 23. The section 1, in proximity to its inner end, has arranged therein a sheave 24, which is spaced from and arranged forwardly with respect to the sheave 21. The sheave 24, when the draft mechanism is used for a three hitch, is removed. The sheave 24 is only employed when the draft mechanism is set up for a five hitch.

When the draft mechanism is set up for a five hitch, the connecting members 17 and 18 are extended into the inner end of the section 2, and secured therewith by suitable hold-fast devices. A pair of hold-fast devices 25 is employed for securing the member 17 to the section 2, and a single hold-fast device 26 is used for securing the member 18 to the section 2. See Figure 3. When employing the draft mechanism for a three hitch, the section 2 has connected therewith a pair of extensions 27, 28, which project from opposite ends of the section 2 and are suitably secured therewith. When the draft mechanism is set up for a five hitch, the extension 27 is removed and attached to the outer end of the section 1. See Figures 2 and 3. Each of the extensions is U-shaped in cross section throughout the length thereof and includes a rear wall 29, a top wall 30 and a bottom wall 31. See Figure 4. Arranged within each of the extensions as well as projecting from the outer end thereof, is a sheave 32, and arranged within each of the extensions as well as projecting from the inner end thereof, is a sheave 33. Each of the extensions is open at its front and fixedly secured to the top wall 30, intermediate the ends thereof, as at 33, is an inclined brace bar 34, which has its inner end suitably connected, as at 35, to an end of the section 1, or to an end of the section 2.

When the draft mechanism is employed for a three hitch, the extensions 27 and 28 extend a substantial distance into the section 2, from opposite ends thereof, and the extensions are suitably connected, as at 36, to the section 2.

Travelling around the sheaves 21 and 23 within the section 2, as well as forwardly of and against the sheave 22, is a cable 37, having its ends 38 and 39 projecting forwardly from said section 2 and provided with attaching hooks 40 for hitching purposes. Travelling around the sheaves 32, 33, in each extension, is a cable 41 having its ends 42, 43 projecting forwardly with respect to said trees and said section and carrying attaching hooks 44 for hitching purposes.

When the draft mechanism is set up for a five hitch, the extensions 27 is extended into the outer end of and secured to the section 1, and the cable 41 thereof has its ends 42, 43 project forwardly from the extension 27 and section 1. When employing the mechanism for a five hitch, the section 2 is secured to the section 1 so that the inner end of the former will abut against the inner end of the latter. See Figure 3. Travelling around the sheaves 11 and 13 and forwardly of and against the sheave 12, is a cable 45, having its ends 46, 47 projecting forwardly from the section 1 and provided with attaching hooks 48 for hitching purposes. Travelling around the sheaves 14 and 24 and rearwardly of and against the sheave 16 and forwardly of and against the sheave 15 is a flexible cable 49 having its ends 50, 51 project forwardly from the body portion of the mechanism and are provided with attaching hooks 52 for hitching purposes. When employing the mechanism for a five hitch, there is no change in the arrangement of the tree 28.

When the mechanism is employed for a three hitch, a clevis 53 is pivotally connected, centrally of the section 2, and projects rearwardly therefrom. When the mechanism is employed for a five hitch, a clevis 54 is pivotally connected centrally of the body portion and projects rearwardly therefrom. The clevis 53 is shown in Figure 1, and the clevis 54 in Figure 3.

From the foregoing construction and arrangement of parts, it is obvious that a draft mechanism is set up which can be readily used as a three or a five hitch, or a hitch from one to five, and it is thought that the many advantages of a draft mechanism, in accordance with this invention, can be readily understood, and although the preferred embodiment of the invention is as illustrated and described, yet it is to be understood that changes in the details of construction can be had which will fall within the scope of the invention as claimed.

What I claim is:—

1. In a draft mechanism, a body portion U-shaped in cross section and open at each end and formed of two lengthwise aligning sections detachably connected together, a pair of extensions of U-shaped cross section and open at the front and ends thereof, each of said extensions having its inner end terminal portion projecting into an end of the body portion and secured thereto, a set of sheaves journalled within each of said extensions, a plurality of sets of sheaves journalled in said body portion, and an independent cable travelling over each set of sheaves and having the end terminal portions thereof projecting forwardly with respect to said body portion and extensions and provided with attaching hooks.

2. In a draft mechanism, a body portion U-shaped in cross section and open at each end and formed of two lengthwise aligning sections detachably connected together, a pair of extensions of U-shaped cross section and open at the front and ends thereof, each of said extensions having its inner end terminal portion projecting into an end of the body portion and secured thereto, a set of sheaves journalled within each of said extensions, a plurality of sets of sheaves journalled in said body portion, an independent cable travelling over each set of sheaves and having the end terminal portions thereof projecting forwardly with respect to said body portion and extensions and provided with attaching hooks, said extensions being of less width than the width of the body portion and having the forward sides thereof flush with the forward side of the body portion, and inclined brace elements connected to said extensions and to the body portion at the ends thereof.

3. A draft mechanism comprising a body portion having an open front and open ends, a pair of extensions having open fronts and open ends and each connected to an end of the body portion, a set of sheaves journalled within each of said extensions and a set of sheaves journalled within the body portion, the sheaves within each extension being positioned at the inner and outer ends thereof, the sheaves within the body portion positioned rearwardly with respect to the sheaves in the extensions, a cable travelling over each set and having its end terminal portions projecting forwardly with respect to said body portion and extensions and providing with attaching hooks.

In testimony whereof, I affix my signature hereto.

HARRY A. REELEY.